Dec. 11, 1928.
A. G. HEGGEM
1,695,014
VALVE
Filed May 18, 1925
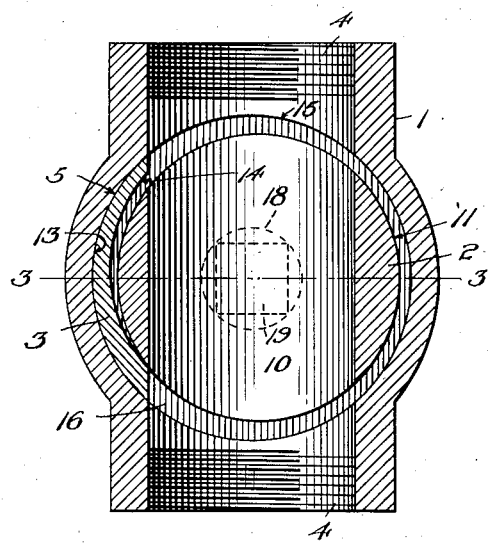
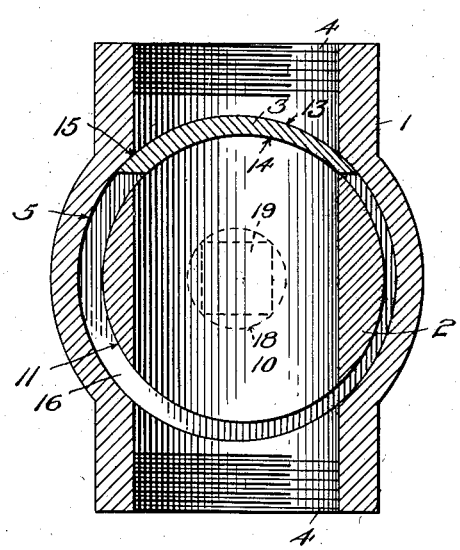
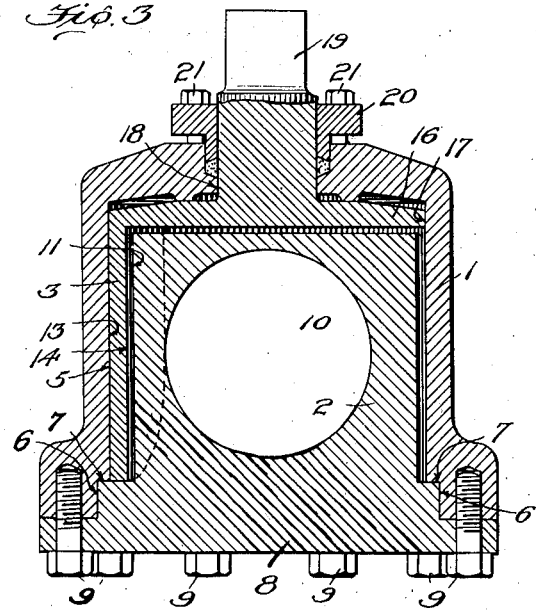
Inventor
Alfred G. Heggem
By Ritter & Ritter
His Attorneys Patented Dec. 11, 1928.

1,695,014

UNITED STATES PATENT OFFICE.

ALFRED G. HEGGEM, OF TULSA, OKLAHOMA.

VALVE.

Application filed May 18, 1925. Serial No. 31,118.

My invention relates to valves and is particularly adapted for embodiment in structures of that nature wherein the passage for the flow of fluid is required to be of comparatively large cross sectional area. A principal object of the invention is to provide a compact and simple form of valve efficiently fulfilling the purposes for which large and cumbersome gate type valves of equal capacity are at present commonly employed. Another object of the invention is to produce a quick operating valve wherein the movable valve member is effectively sealed against the valve casing by a wedging action. Other objects of the invention are to provide a valve device formed of a few simple and rugged parts which may be easily manufactured and readily assembled.

The principal feature of the invention, generally stated, consists in constructing the valve with a body device having a passage for the flow of fluid and having a plurality of curved surfaces which are eccentric to each other and one of which forms a seat for a valve member rotatably mounted on said body device, the said valve member being curved to conform to the said seat and being adapted when rotated to closed position to be wedged against the latter.

A further feature of the invention consists in constructing a valve with a body device having a passage permitting the flow of fluid therethrough and having a curved recess communicating with said passage, and in combining therewith a rotatable valve member adapted to control the flow of fluid through said passage, said valve member having a curved wedge portion adapted to bridge said passage when in closed position and to be housed within said recess when in open position, and the walls of said recess being adapted to have wedging cooperation with said wedge portion of the rotatable valve member.

Another and more specific feature of the invention involves the combination with a valve casing, of a valve mounted therein so as to rotate without axial displacement, said valve being of curved tapered cross section transversely of its axis of rotation.

A further specific feature involves the combination of a valve casing having a cylindrical chamber, an apertured cylindrical plug eccentrically mounted in said chamber, and a curved segmental valve operating between said casing and said plug.

Other features of the invention residing in advantageous details of construction and particular combinations and relations of parts will hereinafter appear and be pointed out in the claims.

In the drawings illustrating preferred forms of construction,

Figure 1 is a longitudinal central section of a valve embodying the invention, showing the relation assumed by the parts when the valve is open.

Figure 2 is a view corresponding to Fig. 1 but showing the relation of the parts when the valve is closed.

Figure 3 is a sectional view on the line 3—3, Fig. 1.

Figure 4 is a view corresponding to Fig. 1 but illustrating a modified form of the invention.

The valve is formed with a body device and a rotatable valve member mounted thereon and cooperating therewith. In its preferred form the body device is constructed in two parts, namely, a valve casing 1 and an apertured plug 2. The rotatable valve 3 extends between and is adapted to have wedging cooperation with these two parts.

The valve casing is formed with a passage 4 permitting the flow of the fluid the valve is designed to control, the said passage preferably being axially disposed with respect to the casing member 1 and being enlarged intermediate its ends to form a chamber for receiving the plug 2 and valve 3. The bounding wall 5 of the enlarged portion of the passage 4 is in the form of a surface of revolution, preferably a cylinder, whose axis intersects that of the passage 4 at right angles.

In order that the plug 2 may extend into the casing 3 the latter is provided with an opening 6 preferably annularly shouldered, as at 7, to form a seat for the correspondingly shouldered flange or plate 8 with which the plug is provided at one end. The plug 2 may, as shown, be rigidly secured to the casing 1 by means of stud bolts 9 extending through suitable holes in the plug flange 8 and screwed into the valve casing.

The portion of the plug member 2 which extends into the enlarged chamber 5 of the casing is apertured so as to provide a passage 10 which is in alinement with the end portions of the passage 4 of the casing. The portion of the plug 2 which projects into the casing 1 has a surface of revolution 11 which preferably corresponds to the surface 5 of the valve casing and therefore, in the present instance, is cylindrical. The curved surfaces 5 and 11 of the casing and plug, respectively, are eccentrically positioned in spaced relation, as well illustrated in the drawings.

The rotatable valve member 3 is of curved segmental form, its external peripheral surface 13 being curved to conform to the adjacent curved surface 5 of the valve casing, and its internal surface 14 having a curvature corresponding to that of the surface 11 of the plug 2 and being disposed eccentrically to the said external surface 13. The curved rotatable valve member 3 is thus caused to be of tapered cross section transversely of its axis of rotation. The center of curvature of the internal surface 14 of the valve member 3 is spaced from that of the curved surface 5 of the valve casing to such an extent that in the operation of moving the valve 3 to closed position, as shown in Fig. 2, the center of curvature of the internal surface 14 of the valve moves in the arc of a circle around the center of curvature of the surface 5 of the valve casing, thereby causing the valve upon being rotated to closed position to wedge between the casing 1 and plug 2 so as to press firmly against the valve seat portion 15 of the curved surface 5 and thus form an efficient seal preventing leakage of the fluid past the valve.

At one end of its curved segment the valve 3 is formed with a circular head or plate 16 whose peripheral edge 17 is adapted to bear against the adjacent face or wall of the cylindrical chamber 5 into which the plug 2 extends. The valve casing 1 has an opening 18 through which projects a stem 19 integrally attached to the valve 3 for operating the latter. The outer end of the valve stem 19 may be squared to receive a hand wheel, handle or suitable operating lever. The opening in the casing 1 through which the valve stem projects may be efficiently packed by a follower 20 secured to the valve casing by means of stud bolts 21.

In the construction heretofore described the valve 3 is designed to be turned always in the same direction when being moved to closed position, but in the modified form of construction illustrated in Fig. 4 the valve may be closed by turning the segmental valve member in either direction. To permit this to be done the curved segmental valve 22 is peripherally tapered in opposite directions from the middle, thus in effect constituting two curved wedges 23 each corresponding to the curved segmental wedge of the valve 3 already described. The construction is otherwise unchanged except for necessary adjustments of proportions, and accordingly corresponding reference numerals have been applied to the parts corresponding to those illustrated in Figs. 1, 2 and 3. The mode of operation of the modified form of construction remains the same, that is to say, when the valve 22 is rotated in a clockwise direction one of its curved segmental wedge portions 23 extends across and closes the passage 4 of the valve casing, the said valve being wedged between the casing and the plug 2; and when the valve is turned in a counter-clockwise direction its other curved segmental wedge 23 similarly cooperates with the casing and plug to effect a closure of the passage 4 on the opposite side of the said plug.

It will be perceived that my invention makes possible the production of valves of large capacity which are of compact form and require a minimum of material. It will also be observed that the form of the rotatable valve member and its relation to the casing 1 and plug 2 are such that efficient operation of the device is attained in a simple manner.

I claim:—

1. A valve involving a body device having a passage permitting the flow of fluid therethrough and having a curved valve seat and a curved surface eccentrically disposed with respect to said seat and to said passage, and a valve member rotatably mounted in said body device and adapted to control the flow of fluid through said passage, said valve member being curved to conform to said seat and being adapted when rotated to closed position to cooperate with said eccentrically disposed curved surface of the body device so as to be pressed against said seat.

2. A valve involving a body device having a passage permitting the flow of fluid therethrough and having a curved valve seat, and a valve member rotatably mounted in said body device and adapted to control the flow of fluid through said passage, said valve member being curved to conform to said seat, said body device and valve member each having a curved surface eccentrically disposed with respect to said valve seat and to said passage, and said curved surfaces being adapted upon rotation of said valve member to closed position to react upon each other so as to press said valve member against said valve seat.

3. A valve involving a body device having a passage permitting the flow of fluid therethrough, and a valve member rotatably mounted in said body device and adapted to control the flow of fluid through said passage, said body device having a plurality of curved surfaces which are eccentric to each other and one of which forms a seat cooperable with said valve member to constitute sealing means for preventing the passage of fluid, the axis of one of said curved surfaces extending at an angle to and being spaced from the axis of said passage, and said valve member having a plurality of curved surfaces which are eccentric to each other and are respectively cooperable with said curved surfaces of said body device, one of said curved surfaces of said valve member being adapted to engage said seat and the other having a center of curvature which traces the arc of a circle around the center of curvature of said seat when said valve member is rotated.

4. A valve involving a body device having a passage permitting the flow of fluid therethrough, and a valve member rotatably mounted in said body device and adapted to control the flow of fluid through said passage, said valve member having an external surface of revolution and an internal surface of revolution, the axes of said surfaces being in parallel spaced relation, and said body device having eccentrically related surfaces of revolution spaced to receive and permit the operation of said valve member between them and one of which is eccentric to the axis of said passage, the said surfaces of revolution of said valve member and the respectively adjacent surfaces of revolution of said body device being in extended engagement with each other when said valve member is in closed position.

5. A valve involving a body device having a passage permitting the flow of fluid therethrough, and a valve member rotatably mounted in said body device and adapted to control the flow of fluid through said passage, said valve member having a curved wedge portion adapted to extend across said passage, said body device having a recess receiving said curved wedge, and the walls of said recess being curved and adapted to have wedging cooperation with said wedge portion, the axis of one of said walls extending at an angle to and being spaced from the axis of said passage.

6. In combination with a valve casing having a passage permitting the flow of fluid therethrough, a rotatable valve, and an apertured plug mounted in said casing and having a portion spaced therefrom to form therewith a housing for said valve when the latter is in open position, said plug having an external surface of revolution which is eccentric to the axis of said passage, and said valve when in closed position being adapted to wedge between said casing and said plug.

7. In combination with a valve casing having a passage permitting the flow of fluid therethrough, an apertured plug mounted therein and having a portion spaced therefrom, and a rotatable segmental valve adapted to be wedged between said casing and said plug, said plug having an external surface of revolution eccentric to the axis of said passage.

8. In combination with a valve casing having a passage permitting the flow of fluid therethrough, an apertured plug having a portion extending into said casing and spaced from the latter, and a rotatable segmental valve adapted to operate between said casing and plug and when in closed position having wedging contact with said casing and plug on opposite sides of the axis of said passage.

9. In combination with a valve casing having a passage formed with an enlarged portion whose interior bounding wall is a surface of revolution, an apertured plug positioned in said enlarged portion and spaced therefrom, said plug being formed with an external surface of revolution having its axis spaced from the axis of said passage, and a valve operating in said enlarged portion, said valve being adapted to be wedged between said casing and said plug.

10. In combination with a valve casing having a passage enlarged intermediate its ends to receive a valve member, and having portions on opposite sides of said enlargement disposed in axial alinement, an apertured cylindrical plug mounted in said enlarged portion in spaced relation to said casing, and a valve adapted to have wedging engagement with said casing and said plug, the axis of said passage and that of the plug being spaced from each other.

In testimony whereof I affix my signature.
ALFRED G. HEGGEM.